March 9, 1948.     F. B. HALFORD     2,437,385
JET PROPULSION PLANT
Filed July 20, 1943

Inventor
Frank Bernard Halford
By
Loyd Hall Sutton
Attorney

Patented Mar. 9, 1948

2,437,385

UNITED STATES PATENT OFFICE 2,437,385

JET PROPULSION PLANT

Frank Bernard Halford, Edgware, England, assignor to The De Havilland Aircraft Company Limited, Edgware, England, a company of Great Britain Application July 20, 1943, Serial No. 495,516
In Great Britain November 21, 1941

Section 1, Public Law 690, August 8, 1946
Patent expires November 21, 1961

6 Claims. (Cl. 285—90)

This invention relates to apparatus for the propulsion of aircraft of the type disclosed in my application Serial No. 495,517, filed of even date herewith, though it may be adapted for use on seacraft or on land vehicles. The invention has for its object to effect certain improvements in the detail structure of apparatus of a known type in which air is delivered by a compressor into a series of compartments or separate combustion chambers wherein fuel is burnt, the resultant hot gases first acting on a turbine which drives the compressor and then issuing into the atmosphere in the form of one or more jets which have a propulsive effect.

According to this invention there are a series of separate tubular and air-jacketed combustion chambers disposed adjacent with lateral branches forming connecting passages between adjoining chambers and their jackets, these connections comprising two concentric tubular members with an annular passageway between them and each having a degree of flexibility at least in the axial direction and constituting lateral passages between adjoining chambers and their jackets, these connections being composed of similar parts associated with each combustion chamber and adapted to be coupled together and comprising an outer tubular member having a connection with the jacket of the combustion chamber and constituting a branch from that jacket, and an inner tubular member which extends with a telescopic sliding connection from the wall of the combustion chamber, a flange on the outer end of each of these tubular members, these flanges being adapted to lie against each other, and means for clamping together all the flanges of these branch connections from adjoining chambers and thereby coupling simultaneously the passages between these chambers and their air jackets. In one arrangement the outer tubular member which extends from the air jacket is constituted by a tube which is rigidly attached at one end to the wall of the air jacket and carries at its outer end a flange while its intermediate part is provided with circumferential corrugations which provide the desired flexibility in the connection between the air jackets of adjoining chambers. In an alternative arrangement the outer tubular member which extends from the air jacket of each combustion chamber is constituted by a tubular lug which is fixed to and projects from the wall of the air jacket, and a separate tube part at one end of which is a flange while its other end carries on its exterior an expanding ring such as a piston ring and this lies and can slide within the fixed lug. In this latter arrangement the tubular connections may be coupled up together by a series of bolts passed through holes in the flanges of both the inner tubular members and of both the outer tubular members whereby all these flanges are clamped together. Alternatively these flanges may be clamped together by a union nut device. The parts thus connected are free to float and move at least in the axial direction with respect to the several fixed tubular lugs on the walls of the combustion chambers and their air jackets.

In the case of the inner tubular member it is constituted by a tubular lug which is fixed to and projects from the wall of the combustion chamber and a separate tube part at one end of which is a flange with holes therein to permit the passage of air while towards its other end this tube part has an annular bulge forming an enlargement with a curved surface adapted to engage the interior of the fixed lug wherein this part can slide. In an alternative arrangement of this sliding and flexible connection between the fixed tubular lug and the inner branch tube, the end part of the fixed lug may be enlarged and given a part-spherical form adapted to lie within the end portion of the branch tube which is then made cylindrical and straight. This arrangement is the converse of that described above and in this case the branch tube can slide and rock slightly on the fixed lug instead of within it. Yet again, while making the end portion of the branch tube cylindrical and of a diameter which will allow it to lie within the tubular lug, the latter is provided with a rib which runs circumferentially and is pressed inwards from the wall of the lug. This annular rib is suitably rounded where it lies in contact with the end portion of the branch tube which can thus slide and rock somewhat to give the necessary flexibility. If found desirable the inner branch tube may also be made flexible by providing it with circumferential corrugations.

The lateral connecting passages of each two adjacent combustion chambers may be clamped up together by screw unions engaging flanges at the ends of the outer branch tubes, the flange on the end of the inner tube being clamped up between the flanges of the outer branch tubes. Gaskets may be employed if desired.

The series of combustion chambers thus connected together may be arranged in various ways.

The accompanying drawings illustrate by way of example two alternative ways in which the invention may be carried into practice. In these drawings—

Figure 1:
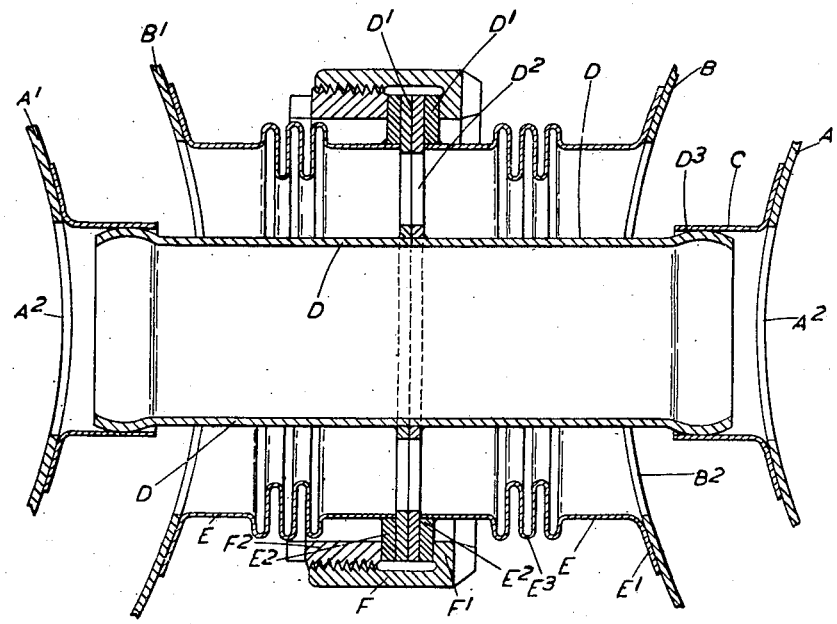
Figure 1 is a longitudinal sectional elevation of one form of the improved connection.

Referring to Figure 1 there is shown at A and $A^1$ parts of the walls of two adjacent combustion chambers which are to be connected together. At B and $B^1$ are shown parts of the walls of the corresponding air jackets enclosing these combustion chambers. Fixed to each combustion chamber wall A and $A^1$ and around an opening $A^2$ in that wall is a tubular lug C and with its one end lying within this lug is a short tube length D which has at its outer end a flange $D^1$ with holes $D^2$ through it. The end of the tube D which lies within the lug C is somewhat enlarged to form a curved annular part $D^3$ the surface of which as it lies against the inner surface of the lug permits the tube D to slide and also rock thus allowing for alignment of the connection between the combustion chambers A and $A^1$. In each of the walls B and $B^1$ of the air jackets is a hole $B^2$ of such dimensions as will permit free flow of air between these air jackets through the tubular connection around the tubes D. A tubular member E has its one end fixed at $E^1$ around the hole $B^2$ in the wall of an air jacket and at its opposite or outer end is a flange $E^2$. In the centre part of its length this tubular member E is provided with a series of circumferential corrugations $E^3$ which give to the tube a degree of flexibility. The tubular members E projecting from the walls B and $B^1$ of the adjacent air jackets have their flanges $E^2$ brought together with the flanges $D^1$ of the inner tubes D between them. All these flanges are then clamped up together by a screw union of which the one part F surrounds the flanges with an inwardly directed flange $F^1$ which lies against the face of one tube flange $E^2$, while the other part $F^2$ of the union screws into the outer part F and butts up against the face of the other tube flange $E^2$.

Figure 2:
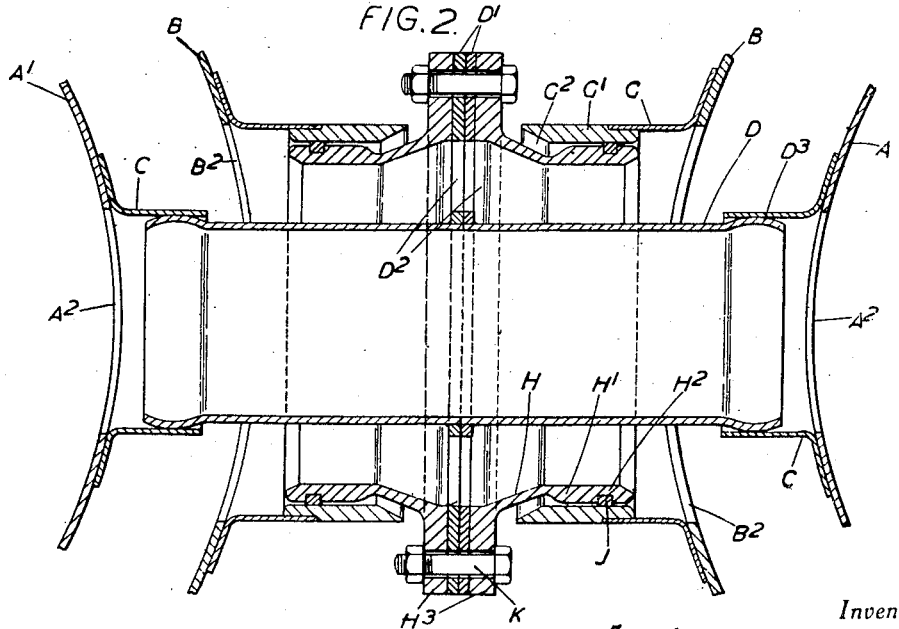
Figure 2 is a similar view of an alternative form.

In the alternative construction shown in Figure 2 the arrangement of the inner tubular connection between the adjacent combustion chambers A and $A^1$ is as described above and shown in Figure 1. The construction of the outer tubular connection is however modified. In this case a tubular lug G is fixed to the wall B and $B^1$ of each air jacket around the hole $B^2$ and along the outer end part of each lug is an internal thickening $G^1$ which is conveniently bevelled off at its end as at $G^2$. Engaging this lug G so that it can slide telescopically within it is the one end of a separate tubular member H having at this end a thickening $H^1$ in which is an external groove $H^2$ wherein lies an expanding ring J similar to a piston ring. This ring lies and can slide within the thickened part $G^1$ of the lug G. At its opposite end the tube H has a flange $H^3$ and between these flanges lie the flanges $D^1$ of the inner tubes D all these flanges being clamed together by bolts K passing through holes in the flanges. Instead of employing bolts the flanges $H^3$ and $D^1$ may be clamped up together by a two-part union nut device similar to the screw union F, $F^1$, $F^2$ described above as employed in the construction shown in Figure 1.

In each of the arrangements described above there is provided efficient sealing both with respect to the hot gases in the combustion chambers and also the air in the jackets. The necessary flexibility is also provided to allow the expansion and alignment of the connections. The arrangement shown in Figure 2 is especially a robust structure and suited for easy assembly and dismantling in that the abutting flanges of both the inner and outer tubes D and G can be turned round with these tubes in their respective fixed lugs while the bolts K are tightened up.

What I claim as my invention and desire to secure by Letters Patent is:

1. In apparatus of the character described, in combination with adjacent chambers adapted to be subjected to high heat and an air jacket for each of said chambers, tubular means forming a connection between adjacent chambers, tubular means forming a connection between adjacent jackets and concentric with said first named connection to form an annular passageway therebetween, said connections respectively constituting lateral passages between said chambers and said jackets, said connection between said jackets including a pair of similar outer tubular members connected at one end to a jacket and constituting a branch therefrom, said connection between said chambers including a pair of similar inner tubular members having at one end a sliding connection associated with the wall of a chamber, each of said outer and inner tubular members having a flange at its end remote from the jackets and chambers, said flanges adapted to be against each other, and means for clamping said flanges together to couple simultaneously the passages between the jackets and chambers.

2. In apparatus of the character described, in combination with adjacent chambers adapted to be subjected to high heat and an air jacket for each of said chambers, tubular means forming a connection between adjacent chambers, tubular means forming a connection between adjacent jackets and concentric with said first named connection to form an annular passageway therebetween, said connections respectively constituting lateral passages between said chambers and said jackets, said connection between said jackets including a pair of similar outer tubular members having at one end an external flange and at the other end being connected to the wall of a jacket around an opening therein, said connection between said chambers including tubular lugs attached to the walls of the chambers around openings therein and a pair of similar inner tubular members having at one end an external flange with openings therein and the opposite end engaging telescopically the lug on a chamber, and means for clamping together the flanges of the inner and outer tubular members to couple simultaneously passages between the jackets and chambers.

3. In apparatus of the character described, in combination with adjacent chambers adapted to be subjected to high heat and an air jacket for each of said chambers, tubular means forming a connection between adjacent chambers, tubular means forming a connection between adjacent jackets and concentric with said first named connection to form an annular passageway therebetween, said connections respectively constituting lateral passages between said chambers and said jackets, said connection between said jackets including a pair of similar outer tubular members each formed in two parts with the one end of one part attached to the wall of a jacket around an opening therein and the other end of said one part engaged telescopically with one end of the second part, said second part having an external flange at its opposite end, said connection between said chambers including a pair of similar inner tubular members formed in two parts with the one end of one part attached to the wall of a chamber around an opening therein and the other end of said one part engaged telescopically with one end of the second part, said second part having an external flange at its opposite end, and means for clamping together the flanges of said connections to couple simultaneously the passages between the jackets and chambers.

4. In apparatus of the character described, in combination with adjacent chambers adapted to be subjected to high heat and an air jacket for each of said chambers, tubular means forming a connection between adjacent chambers, tubular means forming a connection between adjacent jackets and concentric with said first named connection to form an annular passageway therebetween, said connections respectively constituting lateral passages between said chambers and said jackets, said connection between said jackets including a pair of similar outer tubular members having an external flange at one end and connected at the other end to the wall of a jacket around an opening therein, said connection between said chambers including a pair of similar inner tubular members each formed in two parts with one end of one part attached to the wall of a chamber around an opening therein and the other end of said one part in telescopic relation with an end of said second part, one of said telescopically related ends having a curved annular bulge in engagement with the other of said cooperating ends and said second part having at its opposite end an external flange with apertures therethrough, and means for clamping together the flanges of said connections to couple simultaneously the passages between the jackets and chambers.

5. Apparatus according to claim 3 wherein an expanding ring is interposed between the telescopically related ends of the two parts of each tubular member included in the connection between the jackets.

6. Apparatus according to claim 2 wherein each outer tubular member included in the connection between the jackets has in its length an axially flexible corrugated section.

FRANK BERNARD HALFORD.

REFERENCES CITED

The following references are of record in the file of this patent:

UNITED STATES PATENTS

| Number | Name | Date |
|---|---|---|
| 647,651 | Dow | Apr. 17, 1900 |
| 999,976 | De Ferranti | Aug. 8, 1911 |
| 1,954,454 | McFarland | Apr. 10, 1934 |
| 2,131,781 | Lisholm | Oct. 4, 1938 |
| 2,300,547 | Guarnaschelli | Nov. 3, 1942 |